United States Patent [19]

Flint et al.

[11] Patent Number: 5,468,111
[45] Date of Patent: Nov. 21, 1995

[54] DISC LOADING AND UNLOADING ASSEMBLY

[75] Inventors: Alan Flint, San Diego County; Quy Nguyen; William G. Jacobs, both of Santa Clara County, all of Calif.

[73] Assignee: Seagate Technology, Inc., Scotts Valley, Calif.

[21] Appl. No.: 121,037

[22] Filed: Sep. 13, 1993

Related U.S. Application Data

[63] Continuation of Ser. No. 823,883, Jan. 22, 1992, abandoned.

[51] Int. Cl.$^6$ .................................... B65G 49/05
[52] U.S. Cl. .................. 414/416; 414/938; 414/225; 414/941; 414/940; 414/939; 414/908; 414/217; 414/751; 118/500; 118/719
[58] Field of Search .................. 414/403, 404, 414/908, 416, 417, 751, 626, 618, 619, 222, 225, 935, 937, 938, 940, 941, 939, 752, 753; 204/298.25, 298.26; 118/719, 500; 294/32, 93, 97

[56] References Cited

U.S. PATENT DOCUMENTS

| | | | |
|---|---|---|---|
| 4,457,661 | 7/1984 | Flint et al. | 414/404 |
| 4,466,766 | 8/1984 | Geren et al. | 414/404 |
| 4,648,774 | 3/1987 | Dorumsgaard et al. | 414/416 |
| 4,701,096 | 10/1987 | Fisher, Jr. | 414/938 X |
| 4,886,412 | 12/1989 | Wooding et al. | 414/416 |
| 4,911,597 | 3/1990 | Maydan et al. | 414/217 |
| 4,981,408 | 1/1991 | Hughes et al. | 414/217 |
| 4,983,093 | 1/1991 | Foulke et al. | 414/416 |

FOREIGN PATENT DOCUMENTS

| | | | |
|---|---|---|---|
| 121106 | 6/1987 | Japan | 414/416 |
| 202522 | 8/1988 | Japan | 414/217 |
| 7540 | 1/1990 | Japan | 414/941 |

Primary Examiner—Frank E. Werner
Attorney, Agent, or Firm—Flehr, Hohbach, Test, Albritton & Herbert

[57] ABSTRACT

An assembly for transferring discs between disc manufacturing machinery or processes comprises a series of storage cassettes having discs stored therein. Each stored disc is retrieved from the cassette and placed into a shuttle which carries the disc while it is processed. The processed disc is retrieved from the shuttle subsequent to the disc manufacturing process and placed into a second storage cassette. The apparatus transfers the discs by gripping them between a stationary member which engages the edge of the disc and a selectably moveable member which engages the disc hole such that the disc is pinched between the two gripping members. The gripping and transferring functions are controlled by a computer.

12 Claims, 6 Drawing Sheets

DISC LOADING AND UNLOADING ASSEMBLY

This is a continuation, of application Ser. No. 07/823,883, filed Jan. 22, 1992, now abandoned.

FIELD OF THE INVENTION

The present invention relates to assemblies for loading and unloading computer memory discs to and from disc manufacturing machinery. More specifically, the present invention relates to loading and unloading sensitive computer memory discs to and from mechanical and chemical processing equipment used in disc manufacture.

BACKGROUND OF THE INVENTION

Computer memory discs or "hard discs", as they are often referred to in the computer industry, are being produced in increasingly larger numbers as the need for industrial and personal computers grows. Hard discs essentially comprise a base disc composed of aluminum onto which magnetic material is sputtered. Discs of this type are widely used as storage devices in work stations, in desk top and lap top computers, and in industrial computers commonly used for system control.

The continuing trend toward storing information on hard discs has increased the desire to automate disc manufacture. Currently, automated machinery exists for washing discs and for sputtering discs, as well as for several other disc fabrication processes. However, transferring hard discs between a disc washing machine and a disc sputtering machine involves intervention by an attendant.

Typically, after a disc is washed in an automated disc washing machine, the disc is manually deposited in a disc holding cassette or caddie. Once the cassette is full, an attendant carries the cassette to a sputtering machine station. The attendant then uses a special hand tool to transfer each clean disc from the cassette to a disc shuttle attached to a track running through the sputtering machine. Specifically, the attendant grips the center hole of the disc with the hand tool and physically moves the disc into position for receipt by the shuttle. The loaded shuttles are then trained through the sputtering machine where layers of magnetic material are sputtered onto the aluminum base discs.

Although the above-described method of manually transferring discs from a disc washing machine to a disc sputtering machine has proven effective in the past, this prior art method is laborious and time consuming. Moreover, manual transfer of discs is operator sensitive in that operators may drop or contaminate the discs. In addition, if operators slightly cant discs in the shuttle, these misaligned discs may undergo uneven sputtering. More significantly, misaligned discs may become dislodged from the shuttle while in the sputtering machine, possibly jamming the machine and halting manufacture.

The difficulties suggested in the preceding are not intended to be exhaustive but rather are among many which may tend to reduce the expediency and ease of prior methods of manually transferring hard discs between automated machinery. Other noteworthy problems may also exist; however, those presented above should be sufficient to demonstrate that methods of disc loading and unloading appearing in the past will admit to worthwhile improvement.

Accordingly, it is a general object of the present invention to provide a disc loading and unloading assembly which will obviate or minimize difficulties of the type previously described.

It is another object of the present invention to provide a disc loading and unloading assembly which will increase the efficiency and expediency of hard disc manufacturing.

It is a further object of the present invention to provide a disc loading and unloading assembly which will reduce operator intervention, thereby minimizing broken or defective discs due to operator error.

SUMMARY OF THE INVENTION

In summary, the present invention is an assembly used in conjunction with various disc manufacturing equipment for transferring discs of the type used in computer hard disc drives from a storage cassette to a shuttle which carries the discs to a subsequent manufacturing process or processes. The shuttle returns the discs after processing to the invention and it removes the processed discs from the shuttle and places them into a storage cassette. Integral to the invention is a computer which controls the gripping apparatus that retrieves and deposits the discs from/into the storage cassette. Moreover, the computer controls the mechanism which transfers the discs between the storage cassettes and the shuttle.

BRIEF DESCRIPTION OF THE DRAWINGS

Other objects and advantages of the present invention will become apparent from the following detailed description of a preferred embodiment thereof taken in conjunction with the accompanying drawings, wherein.

DESCRIPTION OF THE PREFERRED EMBODIMENT

Figure 1:
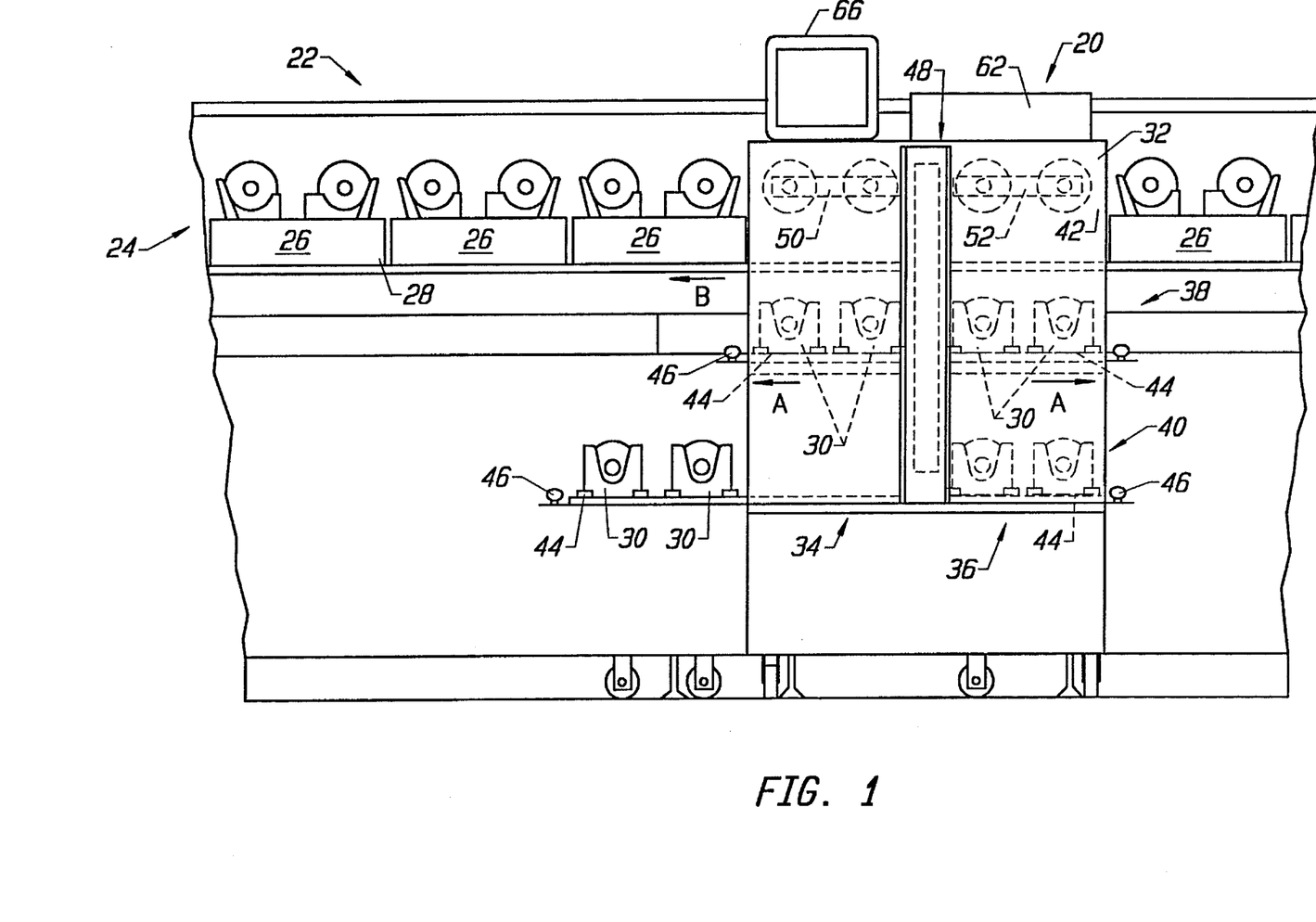
FIG. 1 is a front elevation view disclosing the context of the subject invention and depicts a disc loading and unloading assembly positioned in front of a sputtering machine and an associated disc shuttle transport system in accordance with a preferred embodiment of the invention.

Referring now to the drawings, wherein like numerals indicate like parts, and initially to FIG. 1, there will be seen an operative context of the subject invention. More particularly, a disc loading and unloading assembly, generally indicated 20, in accordance with a preferred embodiment of the subject invention is shown positioned in front of a sputtering machine 22. The sputtering machine includes a shuttle-based disc transport system 24 which incrementally conveys individual shuttles 26 mounted on track 28 through sputtering machine 22. Briefly, the subject disc loading and unloading assembly 20 mechanically transfers discs between cassettes 30 carried in assembly 20 and shuttles 26 positioned in front of assembly 20. Operation of the subject disc loading and unloading assembly in relation to the sputtering machine will be described in more detail below.

Disc loading and unloading assembly 20 essentially includes two sections housed in a cabinet 32, namely a disc loading section 34 and a disc unloading section 36. Both the loading and the unloading sections of assembly 20 have lower levels 38 and 40 for storing disc cassettes 30. Each cassette 30 is configured to hold a plurality of discs, whereas each shuttle 26 carries a maximum of two discs at any given time. The loading and unloading sections also include an upper level 42 for transferring discs between cassettes 30 and shuttles 26.

Cassettes 30 in lower levels 38 and 40 are mounted on slidable trays 44, two cassettes per tray corresponding to the two available positions per shuttle. An attendant may replace cassettes 30 in the lower levels by grasping a knob 46, which is mounted on each tray 44, and sliding tray 44 outward in the direction indicated by arrows A. In loading section 34, empty cassettes are replaced with cassettes filled with discs to be sputtered. Cassettes in unloading section 36 are replaced with empty cassettes for receiving sputtered discs. Here, in FIG. 1, tray 44 of lower level 40 in disc loading section 34 is shown in an extended position to permit an operator to exchange empty cassettes with cassettes containing unsputtered discs.

At the start of each disc transfer process, shuttle 26 positioned in front of loading station 34 is empty, and adjacent cassettes in loading station 34 each contain at least one disc for placement into a shuttle. At the unloading station 36, on the other hand, shuttle 26 contains a pair of discs which have already passed through sputtering machine 22, and adjacent cassettes each have space for receiving at least one disc from the loaded shuttle. In a preferred method of transferring discs between the subject invention and a sputtering machine, as an initial step, assembly 20 removes the two discs carried by the shuttle in front of unloading station 36 and places those two discs into awaiting empty slots in adjacent cassettes located on a lower level of the unloading station. A pair of discs are then picked up from adjacent cassettes located on a lower level of loading station 34 and transferred to the empty shuttle positioned in front of the loading station. Upon completion of the disc transfer, shuttle based disc transport system 24 shifts in the direction of arrow B one shuttle length to position the now empty shuttle in front of the loading station and, concomitantly, to position a shuttle containing newly sputtered discs in front of the unloading station.

In order to effect mechanical transfer of the discs between a shuttle and a disc cassette, disc loading and unloading assembly 20 includes a vertical member, generally indicated 48, as well as a loading arm member 50 and an unloading arm member 52 which extend perpendicularly away from vertical member 48. Arm members 50 and 52 operably travel in unison along the central longitudinal axis of vertical member 48 from upper level 42 to lower levels 38 and 40 and various positions therebetween. Each arm member has two extenders 54 (see FIG. 5) mounted thereon which are operable to engage discs stored within the cassettes or positioned in a shuttle, as will be described in more detail below in association with FIGS. 4 and 5.

Figures 2, 3:
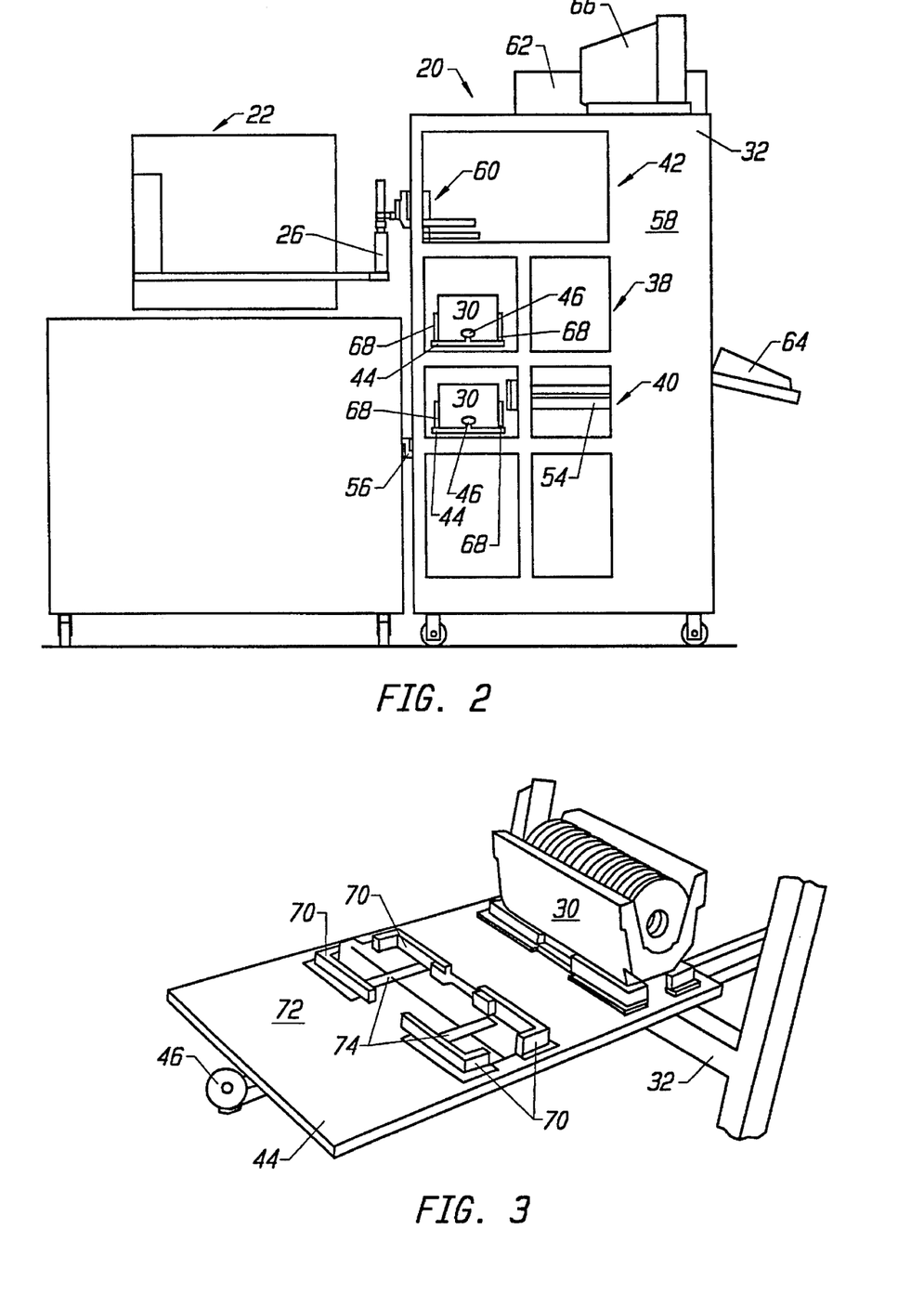
FIG. 2 is a side elevation view of the subject disc loading and unloading assembly positioned in front of a sputtering machine and an associated shuttle transport system.
FIG. 3 is an enlarged, top perspective view of a lower level of the subject disc loading and unloading assembly.

In FIG. 2, there will be seen a side elevation view of the subject disc loading and unloading assembly secured in front of sputtering machine 22 by a clamp 56. Here, vertical member 48 and arm members 50 and 52 are hidden by side wall 58 of cabinet 32. One of the extenders 54 of the loading arm member is shown positioned to engage a disc held in cassette 30 on lower level 40. On upper level 42, a shuttle securing mechanism, generally indicated 60, is shown operably securing shuttle 26 to stabilize the shuttle during the loading process. Unloading station (not shown) also includes an identical shuttle securing mechanism to stabilize the shuttle carrying sputtered discs during the unloading process. The components of shuttle securing mechanism 60 will be discussed in more detail in connection with FIGS. 8–10.

The subject disc loading and unloading assembly further includes a controlling computer 62 for processing operational parameters entered from a keyboard 64. A monitor 66 displays information regarding operation of assembly 20. Additional information is automatically input into controlling computer 62 by a plurality of sensors associated with the subject invention. For example, sensors 68, which are mounted to the lower levels of cabinet 32 on either side of each cassette, detect the presence or absence of discs in an associated cassette. Controlling computer 62 processes the sensor information, in combination with the parameters entered by an operator into keyboard 64, and sends output signals to monitor 66 and/or to a plurality of motors which drive disc loading and unloading assembly 20.

Although the above description illustrates use of the subject disc loading and unloading assembly in association with a sputtering machine, it will be recognized by a skilled artisan that the subject invention may be used with other computer memory disc manufacturing machinery.

FIG. 3 shows a perspective view of a lower level of the subject loading and unloading assembly, and, for descriptive purposes, represent the cassette arrangement for both lower levels 38 and 40 of the loading and unloading stations. Here, tray 44 is in an extended position to permit an operator to access the cassettes carried on the tray. A set of four generally L-shaped brackets 70 mounted on the top side 72 of tray 44 define a rectangular area for receiving a cassette; exact positioning of the tray is important for operation of the subject disc loading and unloading assembly. A pair of sensors 74 are positioned on top side 72 of tray 44 to detect the presence or absence of a cassette, as well as the accuracy of the placement of the cassette. These sensors 74, like sensors 68, electrically communicate with controlling computer 62.

Figure 4:
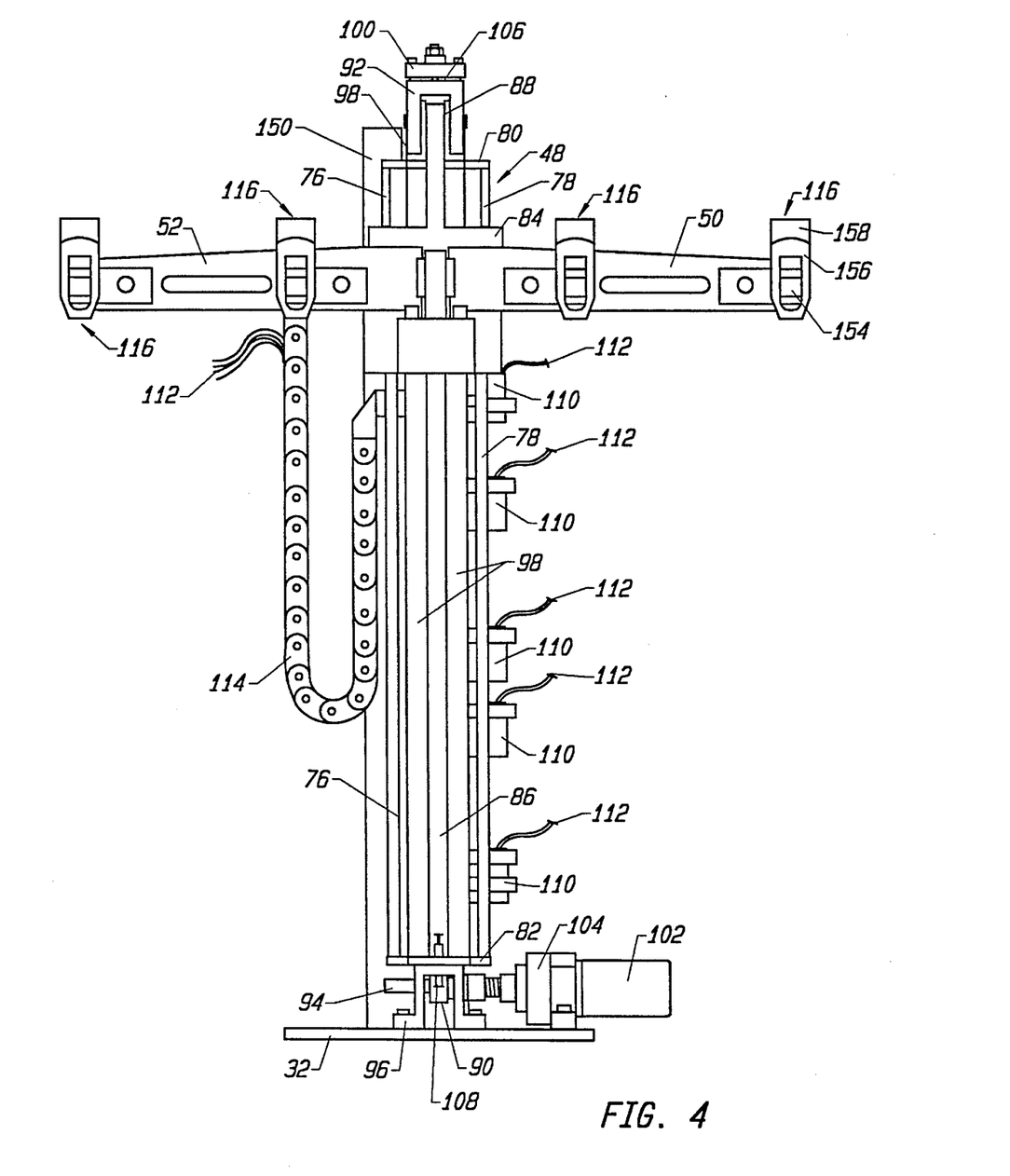
FIG. 4 is an enlarged, rear elevation view of the vertical and horizontal transfer components of the subject disc loading and unloading assembly.

Referring to FIG. 4, vertical member 48 includes two cylindrical rods 76 and 78 mounted between an upper bracket 80 and a lower bracket 82. An arm support plate 84 is slidably attached to rods 76 and 78 for supporting loading arm member 50 and unloading arm member 52. Arm support plate 84 rides up-and-down rods 76 and 78 to vertically position arm members 50 and 52 at predetermined levels for transfer of discs between cassettes in lower levels 38 and 40 and shuttles positioned in front of upper level 42 of the assembly.

Arm support plate 84 is connected to a timing belt 86 which is trained around pulley 88 at one end of vertical member 48 and pulley 90 at the other end. Pulley 88 is mounted between downwardly extending arms of a bracket member 92, which is generally U-shaped in cross-section. At the opposite end of vertical member 48, pulley 90 is mounted about a shaft 94 which transversely extends through a generally U-shaped base mount 96. Base mount 96 is bolted to the base of cabinet 32.

Keeping in mind that FIG. 4 is a back view of vertical member 48, a generally rectangular vertical post 98 is positioned in front of rods 76 and 78 and extends from upper bracket 80 to the base of cabinet 32. Vertical post 98 provides structural stability to rods 76 and 78, as will be described below in conjunction with FIG. 5. A generally rectangular top plate 100 is mounted above and bolted to bracket member 92 at one end and to the upper surface of vertical post 98 at the opposite end (not shown).

To achieve vertical displacement of arm members 50 and 52, an electrical rotary motor 102 drives timing belt 86 by rotating shaft 94. A rotation slower 104 is attached to rotary motor 102 to reduce the rotation speed of shaft 94 to approximately one-third the speed produced by motor 102. This speed reduction is necessary to control movement of timing belt 86 which need only move over small distances at a slow, controlled speed to accurately position arm members 50 and 52 at each predetermined level for disc transfer. Belt 86 may be adjusted for tension at top plate 100 by adjustment screw 106 or at shaft 94 by adjustment screw 108.

The subject loading and unloading assembly 20 also includes a rodless air cylinder 150. Rodless portion 152 maintains contact with one of bearing housings 122 to counterbalance the shifting weight of the assembly as arm members 50 and 52 are vertically positioned along vertical member 48.

A plurality of sensors 110 are provided on one side of vertical post 98 to indicate when the loading and unloading arm members have reached predetermined positions for interaction with disc on upper level 42 and on lower levels 38 and 40 of the subject assembly. Sensors 110 are electrically coupled to controlling computer 62 through wiring 112 enclosed by suspended, flexible chain 114. Chain 114 also carries additional electrical wiring which enables electrical communication throughout the assembly and effectively isolates this somewhat fragile wiring from the mobile components of the assembly.

As discussed previously in connection with FIG. 1, two extenders 54 are bolted to each arm member 50 and 52. A disc gripper 116 is mounted on the end of each extender 54 to facilitate transfer of the discs between the cassettes and a shuttle. Disc grippers 116 operably pick up a disc by securing the inner circumferential surface and the outer circumferential surface of the disc in a clamp-like grip to effect transfer of the disc, as will be described below in conjunction with FIG. 7.

Figure 5:
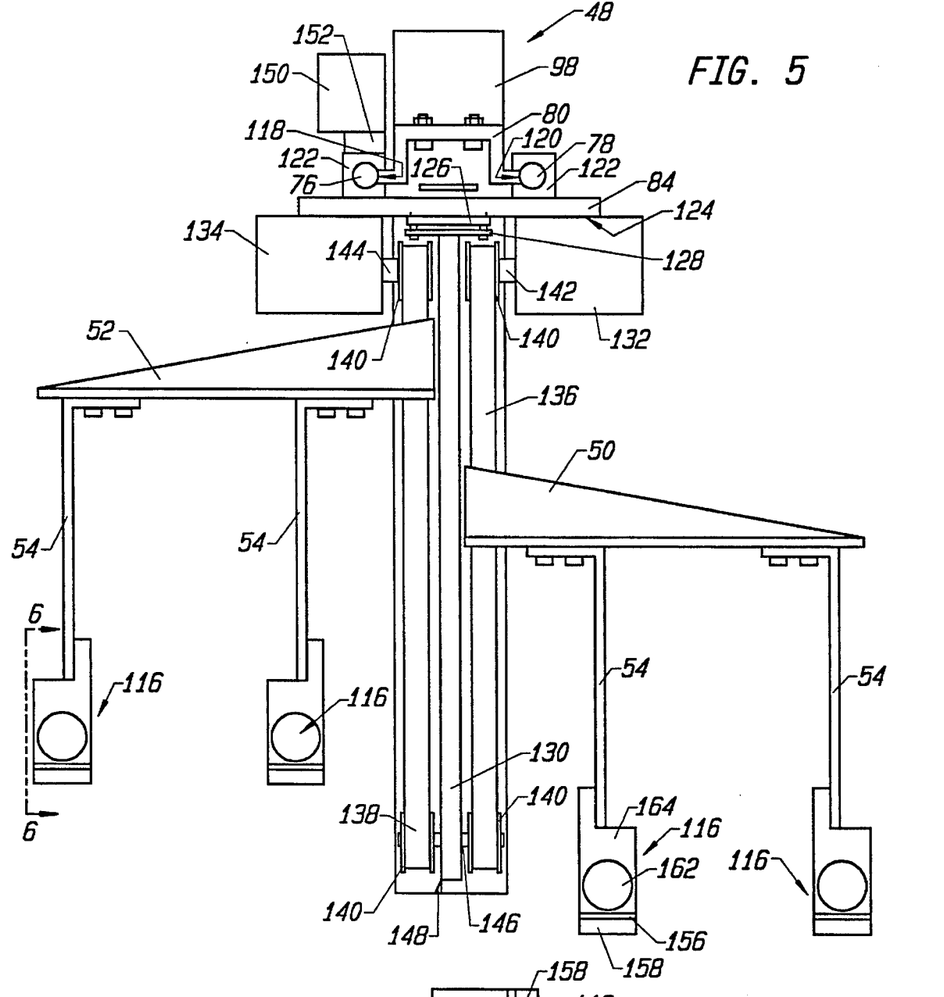
FIG. 5 is a top plan view of the vertical and horizontal transfer components of the subject disc loading and unloading assembly, as disclosed in FIG. 4.

The mechanism for vertically displacing arm members 50 and 52 along rods 76 and 78 is clearly seen in FIG. 5. Upper bracket 80 is bolted to vertical post 98. Although not shown, lower bracket 82 has a configuration essentially the same as upper bracket 80 and is also secured to post 98 by bolts. One side end 118 of upper bracket 80 is secured rod 76, and the other side end 120 is secured to rod 78. Ball bearing housings 122 are slidably mounted about rods 76 and 78. An outer side surface of each housing 122 is fixedly mounted to arm support plate 84 to guide plate 84 up-and-down rods 76 and 78.

Timing belt 86 is secured to the rear surface 124 of arm support plate 84 between plates 126 and 128 which are, in turn, bolted to arm support plate 84. On a front side of arm support plate 84, belt 86 is maintained in a free, unrestricted, yet taut, position. As belt 86 is driven around pulleys 88 and 90 by shaft 94, arm support plate 84, which carries arm members 50 and 52, is carried up-and-down rods 76 and 78.

Although loading and unloading arm members 50 and 52, respectively, move up-and-down rods 76 and 78 together, the arm members may move independently in a horizontal direction. Thus, depending on whether loading or unloading action is desired, one of the arm members moves outwardly toward an appropriate cassette or shuttle, while the other arm member remains in a retracted position. In FIG. 5, loading arm member 50 is shown in an active, extended position, while unloading arm member 52 remains in a normal resting, retracted position.

Arm support plate 84 carries a horizontal rod 130 and two rotary stepper motors 132 and 134. Each stepper motor 132 and 134 drives a timing belt 136 and 138, respectively. Each timing belt is trained around a pair of pulleys, collectively designated as 140. A pulley is mounted about each motor shaft 142 and 144 of motors 132 and 134, respectively. Pulleys are also connected to either end of a rotatable shaft 146 which is perpendicularly mounted through a distal end 148 of rod 130. In operation, motor 132 drives belt 136 to control loading arm member 50, and motor 134 drives belt 138 to control unloading arm member 52. In this manner, arm members 50 and 52 may be moved independently. The importance of independent horizontal movement will become clearer in light of the following description.

In order to load a disc from a cassette onto a shuttle, arm members 50 and 52 descend vertically from upper level 42 to a position slightly above the lower level carrying the disc to be loaded. One of sensors 110 indicate when arm members 50 and 52 have reached the desired vertical position. At this time, stepper motor 32 actuates belt 136 which in turn moves loading arm member 50 forward to a position above and slightly in front of a slot carrying a disc. Motor 102, which controls timing belt 86, then vertically displaces arm members 50 and 52 downward so that the appropriate disc gripper 116 is positioned to the desired position, and permitting disc gripper 116 to release the disc on the shuttle. After the disc is secured in place in the shuttle, motor 102 drives the arm members upward to clear the gripper 116 from the disc. Then, motor 132 retracts loading arm member 50 to its original retracted position adjacent unloading arm 52. Arm members 50 and 52 are subsequently driven upward to upper level 42 where loading arm 50 is projected forward by motor 132 to position the disc in an awaiting shuttle. Although the above description focuses on loading a single disc into a shuttle, in a preferred embodiment of the invention and as disclosed in the drawings, two discs are simultaneously retrieved from adjacent cassettes and loaded into a single shuttle.

A similar sequence of steps involving unloading arm member 52 and stepper motor 134 are followed to unload a pair of sputtered discs from a shuttle and load the discs into empty slots in adjacent cassettes. Once the loading and unloading processes have been completed, the shuttles are shifted to position the now empty, unloaded shuttle in front of the loading station and to position a shuttle carrying newly sputtered discs in front of the unloading station.

Discs to be sputtered are typically withdrawn from a cassette and loaded onto a shuttle from front-to-back of the cassette. Sputtered discs are unloaded from shuttles and placed into a cassette from back-to-front of the cassette. Therefore, while the number of discs carried by cassettes in the loading station exceeds the number of discs placed in cassettes in the unloading station, arms 50 and 52 must be extended independently to avoid damaging discs to be sputtered during the unloading sequence. Likewise, as the number of discs carried in cassettes in the unloading station becomes greater than the same carried by cassettes in the loading station, simultaneous horizontal movement of arms during the loading sequence would damage unloaded, sputtered discs.

Placement and retrieval of discs with respect to cassettes 30 are partially monitored by sensors 68. In addition, a counter in computer 62 keeps track of the position of the arm members for each loading/unloading cycle to advance the arm members through the cassette slot positions in succession.

Figure 6:
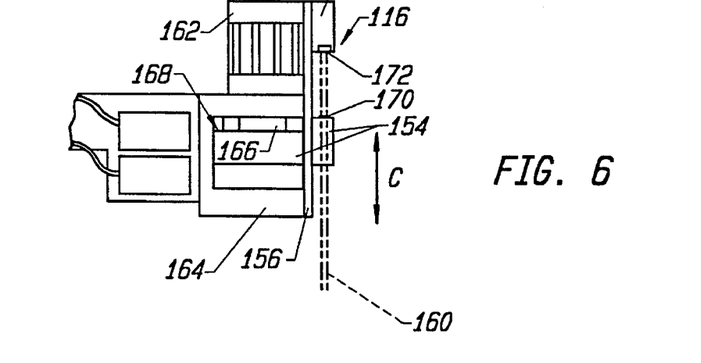
FIG. 6 is an enlarged, side elevation view of a disc gripping mechanism of the subject disc loading and unloading assembly, as taken along line 6—6 in FIG. 5.
Figure 7:
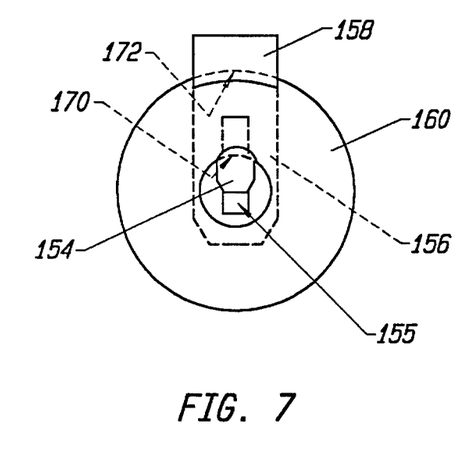
FIG. 7 is an enlarged, front elevation view of the disc gripping mechanism having a disc secured therein, as taken along line 7—7 in FIG. 5.

Turning now to FIGS. 6 and 7, disc gripper 116 includes a movable inner gripper member 154, which extends through a generally rectangular slot 155 in plate 156 of the disc gripper, and a stationary outer gripper member 158. Here, a disc 160, shown in phantom, is gripped between inner member 154 and outer member 158.

In order to secure a disc in the disc gripper, inner member 154 operably moves in a vertical direction between an open position and a closed position, as indicated by arrows C. The sides of rectangular slot 155 in plate 156 slidably contact and vertically guide inner gripper member 154. Movement of the inner gripper member is driven by an air cylinder 162 mounted on a base member 164 of disc gripper 116. More specifically, piston 166 of air cylinder 162 us connected to an upper surface 168 of inner gripper member 154 to control movement of inner gripper 154.

Inner gripper member 154 includes an elongated groove 70 for hugging the inner periphery of a disc, and outer gripper 158 includes an elongated groove 172 which matingly engages the outer periphery of the disc. When piston 166 is extended and inner gripper 154 is in an open position, disc gripper 116 may operably receive a disc. In FIG. 6, inner gripper 154 is shown in a partially retracted position for operably securing a disc between inner gripper member 154 and outer gripper member 158. Piston 166 remains partially extended in this operable disc gripping position.

Sensors 174, which detect when disc gripper 116 is not carrying a disc, are mounted on base member 164. When piston 166 is permitted to fully retract, inner gripper member 154 retracts to a position it can only reach if no disc is present in disc gripper 116, and a signal is sent to controlling computer 62 to indicate no disc is currently being carried by disc gripper 116.

Figure 8:
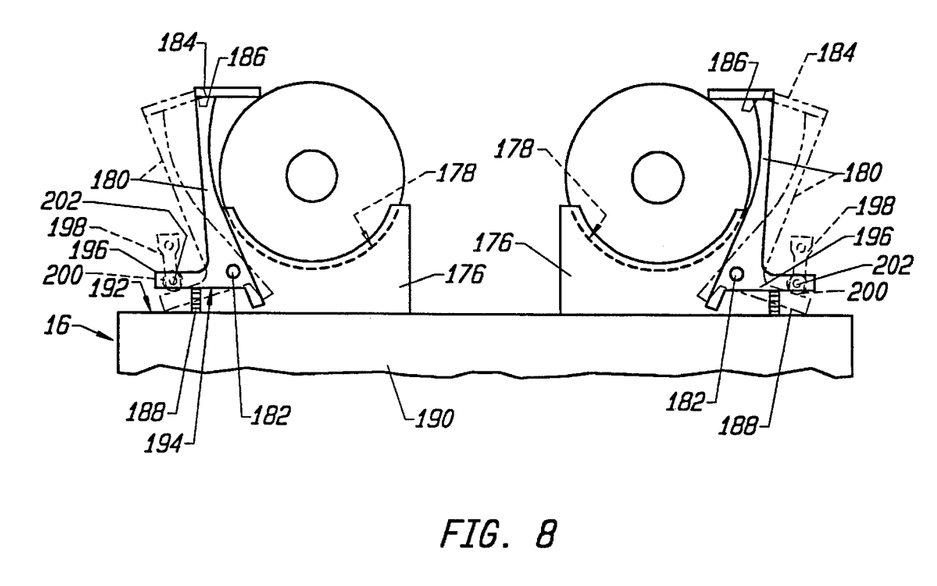
FIG. 8 is an enlarged, front elevation view of a disc shuttle for use with a preferred embodiment of the subject invention.

Referring to FIG. 8, a front view of a shuttle 16 for use with a preferred embodiment of the subject invention is shown. Shuttle 16 has two disc blades, each designated 176, which each have a channel 178, shown in phantom, for receiving discs. A disc clamp 180 is pivotally mounted to each disc blade 176 about a pin 182. Disc clamp 180 includes a securing tab 184 perpendicularly mounted to a top end 186 of disc clamp 180 for securing a disc in place within channel 178. Here, disc clamps 180 are shown by solid lines in a closed position for maintaining a disc in a vertical posture for subsequent engagement by a disc gripper. Disc clamps 180 may operably pivot about pin 182 to an open position, as shown in phantom, for release of the discs. Disc clamp is normally biased in a closed position by a compression spring 188 which is mounted between an upper side 192 of track-engaging base 190 and a lower side 194 of extended tab end 196 of disc clamp 180.

There will also be seen in FIG. 8 components of shuttle securing mechanism 60 including a crank arm 198 and a roller 200 mounted on crank arm 198. When crank arm 198 is rotated about pin 202 by shuttle securing mechanism 60, as will be described below in association with FIGS. 9 and 10, roller 200 applies a downward pressure to extended tab 196 of disc clamp 180 to pivot the disc clamp from a closed position to an open position, thereby permitting release of the disc.

A shuttle securing mechanism 60 is mounted to base 213 on upper level 42 of both loading station 34 and unloading station 36 and serves to stabilize a shuttle during the disc loading and unloading processes. The shuttle securing mechanisms in loading station 34 and unloading station 36 have substantially the same structural design and operate in essentially the same manner, as will be described herebelow.

Figure 9:
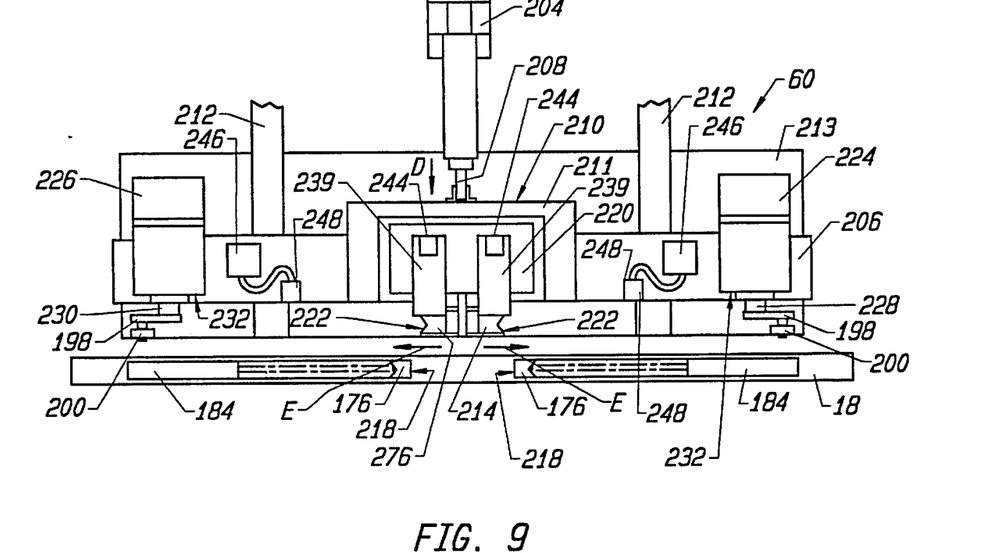
FIG. 9 is an enlarged, top plan view of a shuttle securing and releasing mechanism in accordance with a preferred embodiment of the subject invention.
Figure 10:
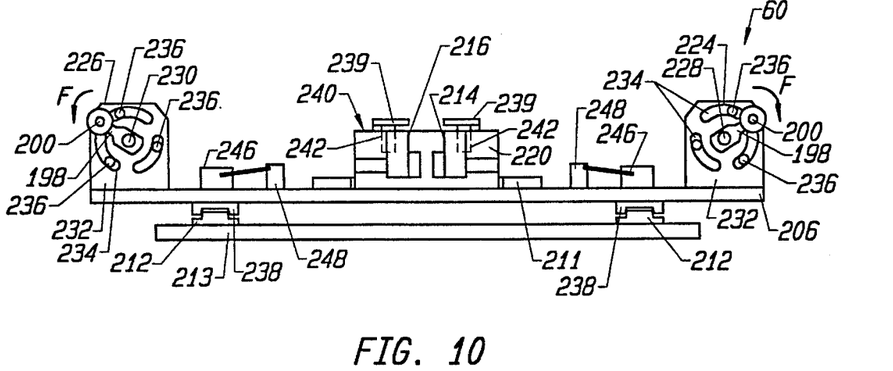
FIG. 10 is a front elevation view of the shuttle securing and releasing mechanism, as disclosed in FIG. 9.

Referring to FIG. 9, shuttle securing mechanism 60 includes an air cylinder 204 having a piston 208 which operably moves a mounting plate 206 forward toward a shuttle on track 18. Shuttle securing mechanism 60 moves forward along rails 212 to engage and secure the shuttle during disc transfer, and then, following disc transfer, retracts plate 206 to a resting position. A pair of slide tracks 238, as shown in FIG. 10, are mounted to the underside of plate 206 for slidable engagement with rails 212. Plate 206 is shown in a retracted position in FIG. 9.

Piston 208 of air cylinder 204 is connected to a front side surface 210 of a generally U-shaped bracket member 211. Bracket member 211 is, in turn, mounted on plate 206 so that extension and retraction of piston 208 controls linear movement of plate 206 along rails 212.

A housing 220 is also mounted on plate 206 and, in a preferred embodiment, is positioned between the legs of generally U-shaped bracket 211. Housing 220 carries and controls lateral displacement of gripping members 214 and 216. When a shuttle is positioned in front of one of either the loading or the unloading station, air cylinder 204 moves plate 206 forward in the direction of arrow D to a position such that shuttle gripping members 214 and 216 are coplanar with shuttle disc blades 176. At this time, air cylinders (not shown) located within housing 220 displace gripping members 214 and 216 outward in the direction of arrows E to securely engage the inner vertical surfaces 218 of disc blades 176. Gripping members 214 and 216 each have an inner surface 222 configured to matingly engage inner vertical surfaces 218.

Once the shuttle is secured by gripping members 214 and 216, rotary motors 224 and 226, which are mounted on either side of plate 206, rotate associated crank arms 198 to pivot disc clamps 180 from a closed position to an open position. Each motor 224 and 226 has a rotatable shaft 228 and 230, respectively, which operably actuates associated crank arms 198. When plate 206 is in an extended position, rollers 200 are disposed above extended tabs 196 of each disc clamp 180. In order to open disc clamp 180, each rotary motor 224 and 226 causes associated crank arm 198 to rotate, thereby positioning roller 200 on extended tab 196. As rotation continues, rollers 200 cause extended tab 196 to move downward, releasing the disc mounted in the shuttle 16. This rotational movement is perhaps better illustrated with reference to FIG. 10.

FIG. 10 illustrates a front elevation view of disc securing mechanism 60 of the subject invention. When air cylinder 204 extends plate 206 towards a shuttle and shuttle is secured, rotary motors 224 and 226 are actuated to rotate associated crank arm 198 in the rotational direction indicated by arrow F. This rotation, as described above, causes each roller 200 to contact an associated tab 196 of each disc clamp 180, thereby opening the disc clamp and releasing the disc. In this manner, discs may be released from or loaded into a shuttle.

Here, crank arms 198 are shown mounted to rotatable shafts 228 and 230 which extend through a front side 232 of each motor 224 and 226, respectively. Front side 232 includes at least one, and preferably three, tracks 234 for receiving screws 236 which may be tightened in tracks 232 to reduce the degree of rotation of crank arms 198.

A pair of sensors 239 are also shown in FIGS. 9 and 10 mounted to an upper surface 240 of housing 220. Focusing of FIG. 10, a downwardly extending tab 242 is shown mounted to each sensor 239. Tabs 242 detect when gripping members 214 and 216 move outward to grip inner vertical surfaces 218 of disc blades 176. Sensors 239 electrically communicate with controlling computer 623 to relay this information through circuitry 244.

In addition to sensors 239, a pair of sensors 246 are mounted on plate 206 for detecting whether a disc is present in a shuttle. When a shuttle is positioned in front of shuttle securing mechanism 60, optical portion 248 of sensor 246 is located in front of the disc, as may be seen in FIG. 9. Sensors 246 also electrically communicate with controlling computer 62.

In describing the invention, reference has been made to a preferred embodiment and illustrative advantages of the invention. Those skilled in the art, however, and familiar with the instant disclosure of the subject invention, may recognize deletions, modifications, substitutions and other changes which will fall within the purview of the subject invention and claims.

What is claimed is:

1. An apparatus for transferring discs between manufacturing machinery comprising:

at least two storage cassettes vertically spaced-apart and being removably mounted on substantially fixed support means and each defining a recess formed for receipt of a plurality of discs arranged in a spaced side-by-side manner;

a loading assembly mounted adjacent said cassettes and including a loading arm having mechanical gripping means formed for gripping engagement with opposed edges of said discs, said loading arm being mounted for vertical aligning movement with each cassette, and mounted for substantial horizontal movement relative an endmost portion of a vertically aligned cassette for sequentially retrieving an endmost disc from said vertically aligned cassette and placing said endmost disc into shuttle means movably mounted proximate said arm for shuttling said endmost disc therefrom to at least one disc manufacturing machine wherein said disc is further processed; and an unloading assembly for retrieving said processed disc from said shuttle means subsequent to said disc manufacturing machine and placing said processed disc into a third storage cassette formed for receipt therein.

2. The apparatus of claim 1 wherein said disc defines a centrally located hole and has a circumferential edge defined by an outer diameter; and wherein said gripping means includes an outer gripper member having a groove into which a portion of said disc edge is engaged; and an inner gripper member to selectably engage said centrally located hole and apply force to said disc along a line between said inner and outer gripper members.

3. The apparatus of claim 1 wherein, said third cassette includes two storage cassettes vertically spaced-apart and each defining a recess formed for receipt of a plurality of processed discs to be arranged in a spaced side-by-side manner, and said unloading assembly is mounted adjacent said third cassettes and includes an unloading arm having mechanical grasping means formed for gripping engagement with opposed edges of said processed discs, said arm being mounted for vertical aligning movement with each third cassette, and mounted for substantial horizontal movement relative an endmost portion of said vertically aligned third cassette for placement of said processed disc into said vertically aligned cassette sequentially at an endmost position closest said unloading arm.

4. The apparatus of claim 3 wherein, each said processed disc defines a centrally located hole and having a circumferential edge defined by an outer diameter and wherein said grasping means includes an outer gripper member having a groove into which a portion of said disc edge is engaged and an inner gripper member to selectably engage said centrally located hole and apply force to said disc along a line between said inner and outer gripper members.

5. The apparatus of claim 1 further including a computer means for controlling at least one of said loading assembly and said unloading assembly.

6. The apparatus of claim 1 wherein at least one of said loading assembly and said unloading assembly transports at least two discs at a time.

7. An apparatus for transferring discs from storage means to shuttle means, which are formed to carry the discs to disc manufacturing machine for processing and returns the processed discs back to the apparatus for removal of the processed discs from the shuttle means and placement back into the storage means, said apparatus comprising:

storage means including at least two storage cassettes vertically spaced-apart and each defining a recess formed for receipt of a plurality of said discs arranged in a spaced side-by-side manner, said cassettes each being positioned upon a respective tray which are each attached to a vertical member;

said shuttle means, positioned above said storage cassettes, being movably mounted proximate said storage means for shuttling said discs between said storage means and said manufacturing machine;

a loading assembly mounted proximate said storage means and including a loading arm having first mechanical gripping means formed for gripping engagement with opposed edges of said discs, said loading arm being mounted for vertical aligning movement with each cassette and said shuttle means, and mounted for substantial horizontal movement relative an endmost portion of a vertically aligned cassette for sequentially retrieving an endmost disc from said vertically aligned cassette and placing said endmost disc into shuttle means for transferring said endmost disc from said vertically aligned storage cassette to said manufacturing machine;

an unloading assembly mounted proximate said storage means and including an unloading arm having second mechanical gripping means formed for gripping engagement with opposed edges of said processed discs, said arm being mounted for vertical aligning movement with a third cassette of said storage means, and mounted for substantial horizontal movement relative an endmost portion of said vertically aligned third cassette for placement of said processed disc into said vertically aligned cassette sequentially at an endmost position closest said unloading arm for transferring processed discs from said shuttle means to said third cassette; and computer means for controlling said loading and unloading assemblies.

8. The apparatus of claim 7 wherein said loading assembly and said unloading assembly transfer at least two discs at a time.

9. The apparatus of claim 7 wherein each said disc defines a centrally located hole and has a circumferential edge defined by an outer diameter and where said first gripping means and said second gripping means each include an outer gripper member having a groove into which a portion of said disc circumferential edge is engaged and an inner gripper member to selectably engage said centrally located hole and apply force to said disc along a line between said inner and outer gripper members.

10. The apparatus of claim 7 wherein said loading assembly and said unloading assembly includes driving means for rotatably driving a drive pulley, said drive pulley being partially circumscribed by a timing belt oriented in parallel relation to said storage means vertical member and fixedly attached to said loading arm and said unloading arm, each said loading arm and said unloading arm extending essentially perpendicular to said vertical member, whereby said driving means moves said loading arm and said unloading arm in a vertical path between said storage cassettes and said shuttle means.

11. The apparatus of claim 10 further includes at least one guide rod oriented parallel to said vertical member and fixedly supported at each end by same, and at least one bearing means circumscribing said guide rod and affixed to said loading arm and said unloading arm for permitting reduced friction vertical motion of said loading arm and said unloading arm along said guide rod.

12. The apparatus of claim 10 further including means for moving said loading arm and said unloading arm independently along a vertical path essentially perpendicular to said vertical member such that said discs can be gripped by said respective first and second gripping means and subsequently moved along said vertical path.

\* \* \* \* \*